US011035878B2

(12) United States Patent
Fillinger et al.

(10) Patent No.: US 11,035,878 B2
(45) Date of Patent: Jun. 15, 2021

(54) ATOMIC FORCE MICROSCOPY SYSTEM, METHOD FOR MAPPING ONE OR MORE SUBSURFACE STRUCTURES LOCATED IN A SEMICONDUCTOR DEVICE OR FOR MONITORING LITHOGRAPHIC PARAMETERS IN A SEMICONDUCTOR DEVICE AND USE OF SUCH AN ATOMIC FORCE MICROSCOPY SYSTEM

(71) Applicant: Nederlandse Organisatie voor toegepast-natuurwetenschappelijk onderzoek TNO, s-Gravenhage (NL)

(72) Inventors: Laurent Fillinger, The Hague (NL); Paul Louis Maria Joseph Van Neer, Bergschenhoek (NL); Daniele Piras, Amsterdam (NL); Marcus Johannes Van Der Lans, Hillegom (NL); Maarten Hubertus Van Es, Voorschoten (NL); Hamed Sadeghian Marnani, Nootdorp (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 16/769,951

(22) PCT Filed: Dec. 4, 2018

(86) PCT No.: PCT/NL2018/050808
§ 371 (c)(1),
(2) Date: Jun. 4, 2020

(87) PCT Pub. No.: WO2019/112424
PCT Pub. Date: Jun. 13, 2019

(65) Prior Publication Data
US 2020/0309816 A1    Oct. 1, 2020

(30) Foreign Application Priority Data

Dec. 5, 2017   (EP) .................................... 17205415

(51) Int. Cl.
*G01Q 60/24*   (2010.01)
*G01Q 70/06*   (2010.01)
*G01N 29/06*   (2006.01)

(52) U.S. Cl.
CPC ......... *G01Q 60/24* (2013.01); *G01N 29/0681* (2013.01); *G01Q 70/06* (2013.01)

(58) Field of Classification Search
CPC ..... G01Q 60/24; G01Q 70/06; G01N 29/0681
(Continued)

(56) References Cited

U.S. PATENT DOCUMENTS 5,503,010 A      4/1996  Yamanaka
10,859,925 B2 *  12/2020 Navarro Paredes ... G01Q 60/32
(Continued)

FOREIGN PATENT DOCUMENTS

DE   102005041301 A1    3/2007
WO      2018132004 A1    7/2018

OTHER PUBLICATIONS

G. Behme et al., "Simultaneous bimodal surface acoustic-wave velocity measurement by scanning acoustic force microscopy", Jul. 31, 2000, Appplied Physics Letters, vol. 77, No. 5, pp. 759-761.
(Continued)

*Primary Examiner* — Nicole M Ippolito
(74) *Attorney, Agent, or Firm* — Banner & Witcoff, Ltd.

(57) ABSTRACT

Atomic force microscopy system comprising an atomic force microscopy device and a substrate carrier having a carrier surface carrying a substrate. The substrate has a substrate main surface and a substrate scanning surface opposite the substrate main surface. The atomic force microscopy device comprises a scan head including a probe. The probe comprises a cantilever and a probe tip arranged on the cantilever. The atomic force device further comprises an actuator cooperating with at least one of the scan head or the substrate carrier for moving the probe tip and the substrate carrier relative to each other in one or more directions parallel to the carrier surface for scanning of the substrate scanning surface with the probe tip. A signal application actuator applies, during said scanning, an acoustic input signal to the substrate, said acoustic input signal generating a first displacement field in a first displacement direction only. A tip position detector monitors motion of the probe tip relative to the scan head during said scanning for obtaining an output signal. The tip position detector is arranged for
(Continued)

monitoring motion of the probe tip only in a direction orthogonal to the displacement direction.

14 Claims, 4 Drawing Sheets

(58) Field of Classification Search
USPC .......................... 850/1, 5, 33, 37, 38, 39, 40
See application file for complete search history.

(56) References Cited

U.S. PATENT DOCUMENTS

| | | | |
|---|---|---|---|
| 2019/0310284 A1* | 10/2019 | van Es | G03F 7/70616 |
| 2020/0057028 A1* | 2/2020 | Piras | G01N 29/38 |
| 2020/0227311 A1* | 7/2020 | Navarro Paredes | H01L 22/20 |

OTHER PUBLICATIONS

Mar. 3, 2019, International Search Report and Written Opinion, PCT/NL2018/050808.

\* cited by examiner

ATOMIC FORCE MICROSCOPY SYSTEM, METHOD FOR MAPPING ONE OR MORE SUBSURFACE STRUCTURES LOCATED IN A SEMICONDUCTOR DEVICE OR FOR MONITORING LITHOGRAPHIC PARAMETERS IN A SEMICONDUCTOR DEVICE AND USE OF SUCH AN ATOMIC FORCE MICROSCOPY SYSTEM

CROSS-REFERENCE TO RELATED APPLICATIONS

This application is a U.S. National Stage application under 35 U.S.C. § 371 of International Application PCT/NL2018/050808 (published as WO 2019/112424 A1), filed Dec. 4, 2018, which claims the benefit of priority to Application EP 17205415.7, filed Dec. 5, 2017. Benefit of the filing date of these prior applications is hereby claimed. Each of these prior applications is hereby incorporated by reference in its entirety.

FIELD OF THE INVENTION

The present invention relates to an atomic force microscopy system comprising an atomic force microscopy device, a substrate carrier having a carrier surface, and a substrate comprising a semiconductor device, said substrate having a substrate main surface, a substrate scanning surface opposite the substrate main surface and at least one substrate side surface oriented transverse to the substrate main surface, said carrier surface being arranged for supporting the substrate main surface of the substrate, the atomic force microscopy device comprising a scan head, the scan head including a probe, the probe comprising a cantilever and a probe tip arranged on the cantilever.

BACKGROUND

Such an atomic force microscopy system is generally known. In such a known atomic force microscopy system a compression wave transducer is attached at the substrate main surface and generates an acoustic input signal having a displacement field in an out-of-plane direction, i.e. transverse to the substrate main surface and thus transverse to the substrate scanning surface. The tip position detector of the known atomic force microscopy system monitors the resulting change in out-of-plane motion at the substrate scanning surface to monitor for subsurface features.

Developments in the semiconductor industry are typically governed by Moore's law which predicts that the number of transistors in a dense integrated circuit doubles every two years. As will be appreciated, this poses significant technological challenges whenever technological boundaries constituted by physical laws are encountered and need to be overcome to meet the industry demands for even smaller and smaller integrated circuits.

One typical challenge encountered already in the twentieth century, was the need to take into account interlayer misalignment between functional layers of a multilayer semiconductor device. In the multilayered structure of semiconductor devices, functional device layers are typically deposited on top of other functional device layers. The functional product features, i.e. the features of the pattern formed in each layer, need to be aligned accurately with those in contiguous functional layers to enable correct operation of the end product: the semiconductor device. This is achieved by monitoring an overlay error during manufacturing, i.e. the amount of misalignment between subsequent layers, by determining relative positions between marker elements in subsequent layers. This improvement, and the advancements achieved after this in the determination of overlay errors, has allowed to continue making semiconductor elements smaller and smaller over the past decades, in accordance with Moore's law.

A disadvantage of the known system and method for determining overlay error, is that the marker features that can be 'seen' are of much larger dimensions than the functional product features, i.e. pattern features, that are nowadays desired in accordance with Moore's law. Therefore, even though the correct alignment of marker elements in subsequent layers of a multilayer semiconductor device can be established by monitoring the overlay error with the known system and method, it can still not be guaranteed that also the smaller pattern features in subsequent layers are correctly aligned. These small pattern features are often overlooked by the thermally induced expansion and excitation of acoustic waves caused by the absorption of the laser beam.

Hence, an undesired or destructive overlay error is more and more difficult to rule out during manufacturing.

SUMMARY OF THE INVENTION

It is an object of the present invention to provide an atomic force microscopy system that e.g. can be applied during manufacturing of a multilayer semiconductor device, and which overcomes the disadvantage described above, allowing the correct determination of overlay errors for even the smallest pattern features desired to be manufactured. It is a further object of the present invention to increase the accuracy of AFM-measurements in general.

To this end, in accordance with a first aspect, there is provided herewith an atomic force microscopy system in accordance with claim 1. The invention is based on the insight generating a displacement field in one direction only (either vertical or lateral with regard to the substrate main surface and by monitoring motion of the probe tip only in a direction that is orthogonal to the first displacement direction can result in an improved analysis of subsurface features in the substrate. Moreover, the system of the present invention may be performed on a wide range of materials with respect to the structures and intermediate layers to be visualized. For example, the atomic force microscopy system can be used to penetrate metal layers, allowing visualization of structures below e.g. EUV type resists or electrode layers. As an additional effect, due to the detectability of alignment and overlay errors on sub-nanometer scale, application of the present invention enables to further reduce the size of alignment features and other device features. This is due to the fact that the system provides a means to monitor the manufacturing process, and thereby to manage it where necessary. In turn, this adds to the performance of semiconductor devices. Please note that according to the prior art monitoring of the motion of the probe tip always takes place in an direction parallel to the displacement direction. Please further note that in the prior art vibration of the cantilever is always detected in a direction which was already present in the generated displacement field, whereas according to the present invention vibration of the cantilever is detected in a direction which was not present in the generated displacement field.

In an embodiment of an atomic force microscopy system according to the invention the first signal application actuator is arranged for generating a first displacement field having a first displacement direction in the out-of-plane direction and in that the tip position detector is arranged for monitoring motion of the probe tip only in an in-plane direction. Since the first displacement direction is parallel to the out-of-plane direction torsional mode AFM provides it has appeared that an enhanced sensitivity by detecting in-plane defects (i.e. parallel to the surface), such as cracks, lattice structure defects or misalignments by monitoring motion of the probe tip in the in-plane direction can be obtained.

In another embodiment of an atomic force microscopy system according to the invention the first signal application actuator is arranged for generating a first displacement field having a first displacement direction in an in-plane direction parallel to the substrate main surface and in that the tip position detector is arranged for monitoring motion of the probe tip only in the out-of-plane direction transverse to the substrate main surface. In a further embodiment of an atomic force microscopy system according to the invention the first signal application actuator is arranged for generating a first displacement field having a first displacement direction in a first in-plane main direction and in that the tip position detector is arranged for monitoring motion of the probe tip only in a second in-plane main direction transverse to the first in-plane main direction. Please note, that the in-plane direction can be a combination of two perpendicular in-plane polarizations, e.g. parallel to x-axis and parallel to y-axis, where the out-of-plane direction is the z-axis. Thus according to the invention it is possible to generate an in-plane polarization (or displacement direction) only in one in-plane main direction (e.g. parallel to the x-direction) and to monitor the displacement only in the perpendicular in-plane main direction (e.g. parallel to the y-direction).

In an advantageous embodiment of an atomic force microscopy system according to the invention the signal analyzer is configured for mapping one or more subsurface structures located in the semiconductor device or configured for monitoring lithographic parameters in the semiconductor device. In particular the signal analyzer can be configured for mapping one or more subsurface structures located in at least one of the layers of the multilayer semiconductor device and configured for determining the overlay or alignment error between a first semiconductor device layer and a second semiconductor device layer. Please note that the signal analyzer can also be configured to e.g. monitor product metrology or any other subsurface feature of interest.

The present invention also relates to a method for mapping one or more subsurface structures located in a semi-conductor device or for monitoring lithographic parameters in a semiconductor device according to claim 6 and to the use of the inventive atomic force microscopy system in a method for mapping one or more subsurface structures located in a semiconductor device or for monitoring lithographic parameters in a semiconductor device according to claim 11.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention.

In the drawings.

DETAILED DESCRIPTION

Figure 1:
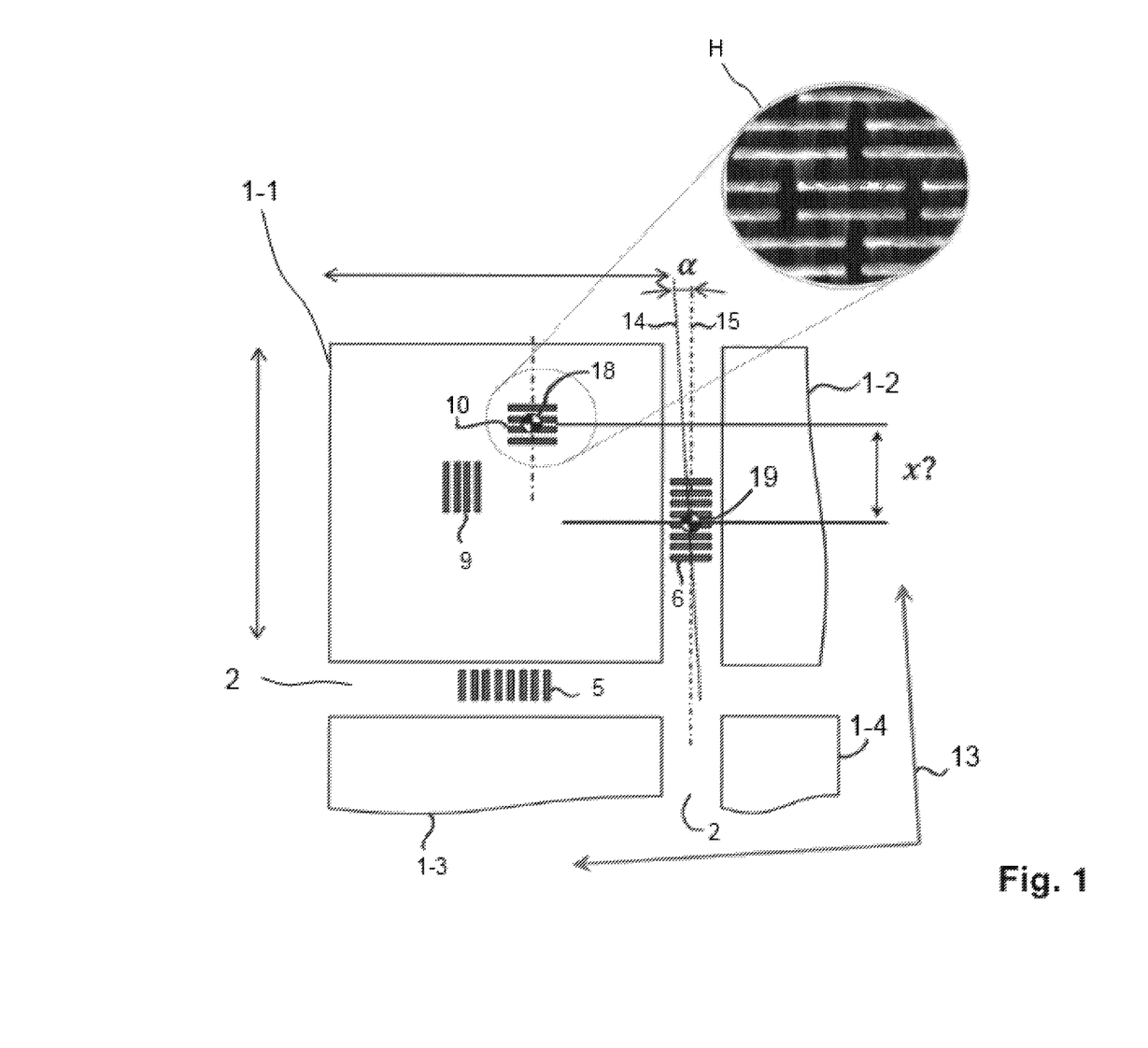
FIG. 1 schematically illustrates a situation sketch of a semi-conductor device during manufacturing.

FIG. 1 schematically illustrates a situation sketch of a semi-conductor device 1-1 on a wafer during manufacturing. During said manufacturing the system according to the invention can be used. In FIG. 1, semi-conductor device 1-1 is arranged on a wafer contiguous to a plurality of further semi-conductor devices 1-2, 1-3, 1-4. The wafer on which the devices 1-1, 1-2, 1-3 and 1-4 are arranged (not visible on the scale of focus of the situation sketch) may be placed on a metrology frame of a system in accordance with the invention which can e.g. be used for determining an overlay error. The metrology frame at the wafer may not be neatly aligned, such that the scribing lanes 2 that separate the respective semi-conductor devices 1-1 to 1-4 (to be used for separating the semi-conductor devices) may be not be perfectly aligned with the metrology coordinate system 13 of the metrology frame. In FIG. 1, this is illustrated by the angle α between the alignment axes 15 of the scribing lane 2 and the alignment orientation 14 of the coordinate system 13 of the metrology frame.

In principle, semi-conductor devices of any arbitrary size may be produced in this manner. The size of the features that may be visualized using a system, device and method of the present invention is determined by the lateral resolution obtainable with AFM, and may be smaller than 1 nanometer (i.e. sub-nanometer size features). The invention therefore can be applied with manufacturing systems and methods that provide semiconductor elements such as multigate devices, e.g. finFETs and gate-all-around structures. Using very high frequency excitation modes, i.e. compression or shear wave signals of tens of gigahertz, the scattering of the signals and the low degree of attenuation allows for overlay and alignment monitoring of relatively thick multilayer semiconductor structures, such as 3D NAND elements. Naturally, the invention may also be applied in combination with larger or more coarse semiconductor structures and can be applied to both multi-layer and single-layer semiconductor devices. Please note that the invention is not restricted to the application of overlay and alignment monitoring but can also be applied for other reasons such as monitoring lithographic parameters in the semiconductor device or to monitor product metrology or any other subsurface feature of interest.

As shown in FIG. 1, in the scribing lanes 2, in between two or more of the semi-conductor devices 1-1 through 1-4 to be created, one or more marker elements 5, 6 are present that allow to detect an overlay error between the subsequent layers of the multilayer semi-conductor devices 1-1 through 1-4. In FIG. 1, as can be seen the marker element 5 is present in the horizontal scribing lane 2 and a marker element 6 is present in the vertical scribing lane 2. The number and orientation of the marker elements, and the scribing lanes or other parts of the wafer wherein these may be located will be at the choice of the skilled person.

In addition, each of the semi-conductor devices 1-1 through 1-4 comprises two or more functional layers which comprise functional product features, also called pattern features or subsurface features 9, 10. In FIG. 1, schematically two pattern features 9 and 10 are illustrated but in reality the complex pattern of product features may be present in each functional product layer.

Conventionally, overlay error is determined by determining the relative positions of the marker elements 5 or 6 in subsequent layers, such as to establish the offset between these marker elements. Based on this offset, the system optics and other system parameters of the layer deposition system are calibrated such as to minimize or completely remove the offset. However, with the integrated circuits to be manufactured nowadays and in the future the pattern features 9, 10 and the line patterns of the marker elements, are of a much smaller size as discussed above (even sub-nanometer scale) and the subsurface features may be embedded at a much larger depth. In the situation sketch of FIG. 1 for example, in the enlargement H, there's provided a scanning electron microscopy (SEM) image of the pattern feature 10. The pattern feature 10 consists of a dense line spacing of unidirectional lines in one layer, and the SEM image shows an area of 500×500 nanometer squared, illustrating that the line pitch is 22 nanometers. Typically, in the situation of FIG. 1 the marker elements 5 and 6 consist of one directional lines having a line pitch of 2.5 micrometers over a total marker area of 80×50 micrometers squared. Thus in the situation sketched in FIG. 1, the pattern features are approximately one-hundred times smaller then the features of the marker elements. Using a conventional method of determining the overlay error, which is for example based on deflection optics, the overlay error measured may not be accurate on the size scale of the pattern features of the patterns 9 and 10. This is for example caused by lens errors and/or other disturbance factors caused in the optical sensing technique, affecting features differently on the size scale of the pattern features 9 and 10, but also on parameters of the sample, such as absorption coefficients, depending on the conventional method used. Therefore, by applying the conventional method of measuring the overlay error, critical mistakes that may cause the semi-conductor elements to be defective or not working can not be prevented.

The present invention allows not only the determination of the overlay error between the marker elements in an conventional manner, but to additionally determine the relative positions within each layer, of the marker elements and one or more or all of the product features 9, 10. The lateral resolution of the imaging method is high enough to visualize the exact layout of each layer including all features, and the invention enables doing this for multiple layers. During manufacturing, this for example allows visualization of the layer underneath a photoresist such as to accurately verify or control the positioning of a mask or illumination pattern prior to patterning the resist.

Figure 2:
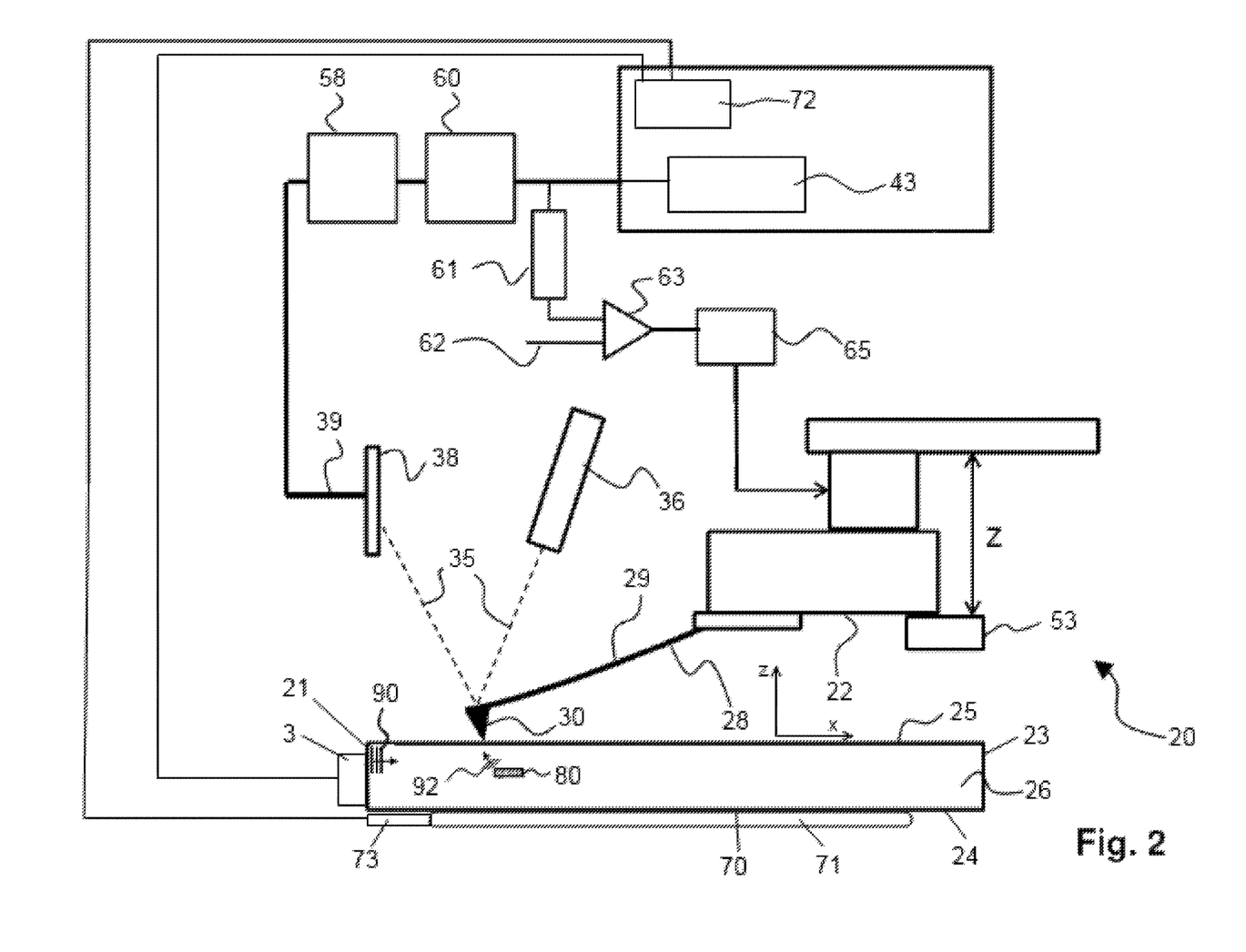
FIG. 2 schematically illustrates a first embodiment of a system in accordance with the present invention with a lateral transducer.

FIG. 2 schematically illustrates a system 20 in accordance with a first embodiment of the invention. In the system 20, a probe 28 is attached to a scan head 22. The scan head 22 enables scanning of the probe 28 relative to the substrate scanning surface 25 of a substrate comprising a multilayer semiconductor device, also called sample 26.

The substrate 26 has a substrate main surface 24, the substrate scanning surface 25 opposite (and parallel to) the substrate main surface 24 and at least one substrate side surface 21, 23 oriented transverse to the substrate main surface 24. The substrate main surface 24 and the substrate scanning surface 25 are spaced from each other in the z-direction, i.e. the out-of-plane direction. The substrate 26 is supported or carried by a substrate carrier 71 having a carrier surface 70, which is most commonly positioned horizontally. To realize scanning over the substrate scanning surface 25 the system 20 comprises an actuator 73 cooperating with the substrate carrier 71 for moving the probe tip 30 and the substrate carrier 71 and thus the substrate scanning surface 25 relative to each other in one or more directions parallel to the carrier surface 70 for scanning of the substrate scanning surface 25 with the probe tip 30, and such that the probe tip 30 is intermittently or continuously in contact with or in very close proximity to the substrate scanning surface 25 during said scanning. Please note that in another embodiment an actuator can be used which cooperates with the scan head 22 to move the scan head 22 over the substrate scanning surface 25.

The probe 28 comprises a cantilever 29 and a probe tip 30. During scanning, the probe tip 30 is brought near to or in contact with the substrate scanning surface 25 of the sample 26. For example the probe tip 30 may be scanned across the surface 25 of the sample 26 in contact mode (continuous contact between the probe tip 30 and the substrate scanning surface 25 of the sample 26). A laser unit 36 provides a laser beam 35 that impinges on the cantilever 29 and reflects towards an optical detector 38 (e.g. photo diode). Using the optical detector 38, vibrations in the cantilever 29 can be sensed due to small deflections of the reflected beam 35 under the influence of such vibrations. This provides an output signal 39 for further analysis. The photo diode 38, in accordance with some embodiments and as further explained in relation to FIG. 4, may be a four quadrant photo diode. As may be appreciated, although in FIG. 1 a single scan head 22 is depicted, the method may equally be applied in systems including multiple scan heads. The optical detector 38 forms part of a probe tip position detector for monitoring motion of the probe tip 30 relative to the scan head 22 during said scanning for obtaining the output signal 39.

In the embodiment shown in FIG. 1 the inventive system enables monitoring motion of the probe tip 30 relative to the scan head 22 in an in-plane direction parallel to the substrate main surface 25 during said scanning for obtaining the output signal 39. In this embodiment the in-plane direction can be the x-direction, the y-direction (which is orthogonal to both the x-direction and the z-direction) or a combination of both. A first signal application actuator 3 applies a first acoustic input signal 90 to the sample 26 generating a displacement field only having a displacement direction parallel to the out-of-plane direction. The system 20 comprises a controller 72 which controls operation of the first signal application actuator 3, such that the first signal application actuator 3 provides an acoustic input signal having an input signal component having a first frequency within a range of 100 kilohertz to 50 megahertz, preferably within a range of 100 kilohertz to 10 megahertz or having a frequency within a range of 50 megahertz to 500 gigahertz.

The acoustic input signal 90 may be of limited duration to prevent heat development. Alternatively, the duration may be longer, or may even be continuous, provided the intensity is limited to keep heat development within limits. The acoustic input signal 90 will propagate through the material of sample 26, and any subsurface structures 80 or density variations encountered will cause a fraction 92 of the input signal 90 to be scattered back to substrate scanning surface 25. The fraction 92 of the input signal is also called return signal 92, which return signal 92 is picked up using the probe 28. Thus the probe tip 30 will experience a motion as a result of this return signal 92. According to the invention the probe tip 30 in contact with substrate scanning surface 25 is arranged to monitor motion of the probe tip only in a direction orthogonal to the displacement direction, i.e. orthogonal to the out-of-plane direction. Thus motion of the probe tip is monitored only in the in-plane direction which motion is induced by acoustic vibrations of the return signal 92. Proper analysis of the output signal 39 allows any sub-surface structures 80 to be visualized by analysis of return signal 92 received via the vibration response of the cantilever 29 and the probe tip 30. This is measured through the photo diode 38 and may thus be derived from the output signal 39 by analyzing the output signal 39. This output signal 39 is provided to the signal analyzer 43. In the signal analyzer 43, a hardware or software module can isolate the scattered fraction 92 from the output signal 39 to provide an image of the subsurface structures 80.

Figure 4:
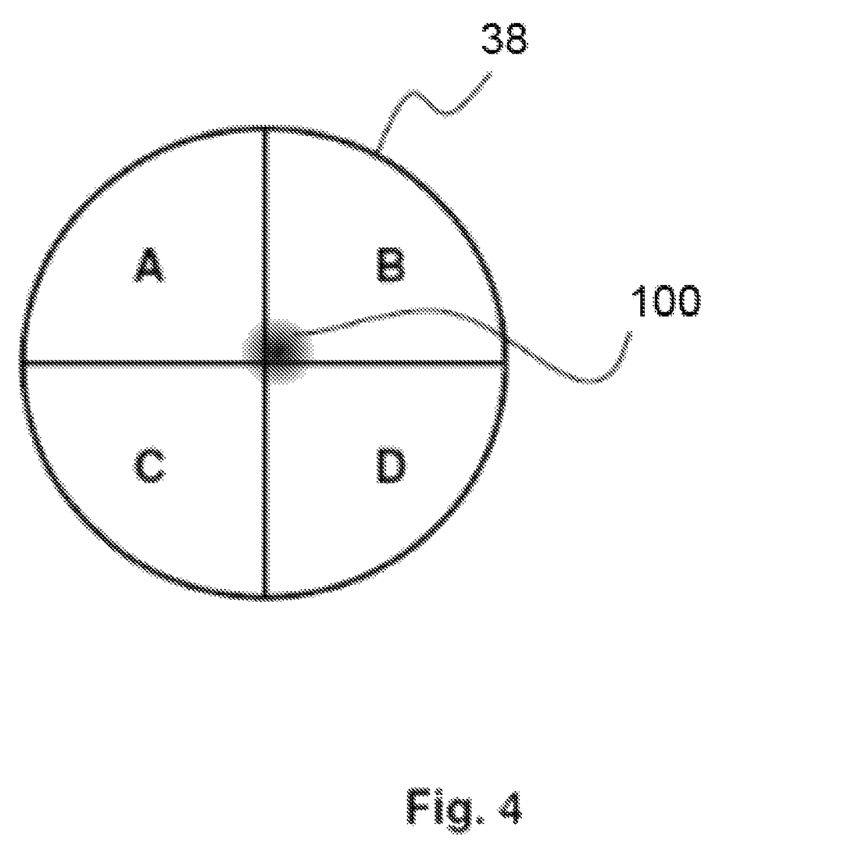
FIG. 4 schematically illustrates a four quadrant photo sensor for use with the present invention.

The system 20 is configured for enabling determination of the torsional signal components, relating to the torsion of the cantilever 29. To this end, the photo diode 38, as explained, may be a four quadrant photo diode. As can be seen in FIG. 4, the photo diode 38 comprises four quadrants designated A, B, C and D. Since the degree of torsion of the cantilever 29 supporting the probe tip 30 is a relative measure of a surface friction caused by the lateral force exerted on the scanning probe, the laser spot intensity for quadrants (A+C)-(B+D) may be regarded as the frictional signal between the probe tip 30 and the substrate scanning surface 25. The analysis is performed in analysis system 43.

Figure 3:
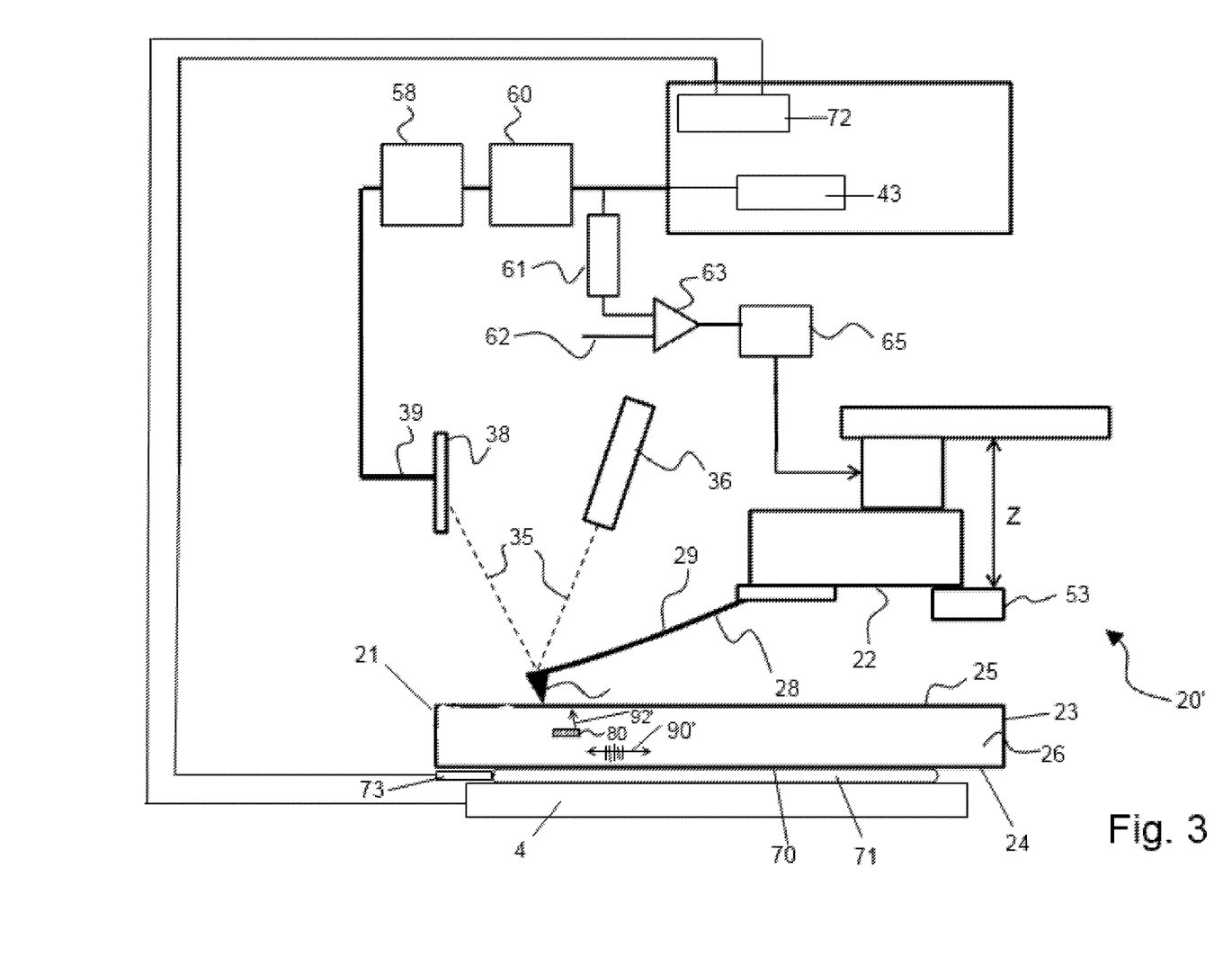
FIG. 3 schematically illustrates a second embodiment of a system in accordance with the present invention with a vertical transducer.

FIG. 3 schematically illustrates a second embodiment of a system 20' in accordance with the invention. Many of the parts and elements of system 20' are similar or even may be identical to those of system 20, or could be different elements providing a same or similar function. For the comprehensibility of the drawings, such elements may have been designated with same or similar reference numerals. At least in those cases where elements have different numbers, such elements may provide a different function in the system.

System 20' includes a second signal application actuator 4 replacing the first signal application actuator 3, which second signal application actuator 4 is mounted underneath the sample 26. In the shown embodiment the second signal application actuator 4 is a piezo type shear wave transducer, which enables the system 20' to apply a shear wave signal 90' with a second displacement field only in a direction parallel to the substrate main surface 24, i.e. parallel to the in-plane direction. In system 20', the shear wave transducer 4 may for example apply a shear wave signal at a second frequency within a frequency range of 100 kilohertz to 50 megahertz, preferably within a range of 100 kilohertz to 10 megahertz or having a frequency within a range of 50 megahertz to 500 gigahertz.

As shown in FIG. 3 the shear wave input signal 90' is applied to the sample 26 using a piezo type transducer 4. The transducer 4 and the system 20' are arranged for transmission of the signal to the main surface 24 of the sample 26. For example, the transducer 4 may be arranged on the sample carrier 71, and coupled to the sample carrier 71 using a transmissive medium which is transmissive with respect to the acoustic vibrations. A suitable medium may for example be provided by a grease or paste. The sample carrier 71 is also provided with a transmissive medium so that the acoustic vibrations are carrier along to the sample 26.

The shear wave signal 90' will propagate through the material of sample 26, and any subsurface structures 80 or density variations encountered will cause a fraction 92' of the input signal 90' to be scattered back to substrate scanning surface 25. The fraction 92' of the input signal is also called return signal 92', which return signal 92' is picked up using the probe 28, and the motion thereof only in the out-of-plane direction (i.e. orthogonal to the direction of the displacement field which is parallel to an in-plane direction) is detected. Proper analysis of output signal 39 allows to visualize any sub-surface structures 80. This again is measured through the photo diode 38 and may thus be derived from the output signal 39 by analyzing the output signal 39. This output signal 39 is provided to the signal analyzer 43. In the signal analyzer 43, a hardware or software module can isolate the scattered fractions 92' from the output signal 39 to provide an image of the subsurface structures 80.

It is noted that the output signal 39 can be subjected to several operations, such as pre-amplification in pre-amplifier 58 and pre-analysis in pre-analyzer 60, is provided both to the lock-in amplifier signal analyzer 43 and to a low pass filter 61. The low pass filter 61 removes the high frequency components relating to the sub-surface measurements from the output signal 39 and provides the signal to a comparator 63. The comparator compares the output signal with the set-point that is received at input 62 (e.g. from the controller 72), and yields a differential signal that is provided to a feedback controller 65. The feedback controller 65 provides a control signal for adjusting the z-level of the probe 28, i.e. the distance in height of the probe 28 above the substrate scanning surface 25. The corrections, which may be obtained from the feedback controller 65 by analyzing the control signal, may be more accurately determined with z-level sensor 53.

The present invention has been described in terms of some specific embodiments thereof. The embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention.

In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like "preferred" etc. is not intended to limit the invention. Additions, deletions, and modifications within the purview of the skilled person may generally be made without departing from the invention, as is determined by the claims. The invention may be practiced otherwise then as specifically described herein, and is only limited by the appended claims.

The invention claimed is:

1. An atomic force microscopy system comprising an atomic force microscopy device, a substrate carrier having a carrier surface, and a substrate comprising a semiconductor device, said substrate having a substrate main surface, a substrate scanning surface opposite the substrate main surface and at least one substrate side surface oriented transverse to the substrate main surface, said carrier surface being arranged for supporting the substrate main surface of the substrate, the atomic force microscopy device comprising a scan head, the scan head including a probe, the probe comprising a cantilever and a probe tip arranged on the cantilever, wherein the atomic force device further comprises:
- an actuator cooperating with at least one of the scan head or the substrate carrier for moving the probe tip and the substrate carrier relative to each other in one or more directions parallel to the carrier surface for scanning of the substrate scanning surface with the probe tip, and such that the probe tip is intermittently or continuously in contact with the substrate scanning surface during said scanning;
- a first signal application actuator for applying, during said scanning, a first acoustic input signal to the substrate, said first acoustic input signal generating a first displacement field in a first displacement direction only;
- a tip position detector for monitoring motion of the probe tip relative to the scan head during said scanning for obtaining an output signal; and
- a signal analyzer configured for receiving and analyzing the output signal from the tip position detector, wherein the tip position detector is arranged for monitoring motion of the probe tip only in at least one direction orthogonal to the first displacement direction.

2. The atomic force microscopy system according to claim 1, wherein the first signal application actuator is arranged for generating a first displacement field having a first displacement direction in an in-plane direction parallel to the substrate main surface and in that the tip position detector is arranged for monitoring motion of the probe tip only in the out-of-plane direction transverse to the substrate main surface.

3. The atomic force microscopy system according to claim 1, wherein the first signal application actuator is arranged for generating a first displacement field having a first displacement direction in a first in-plane main direction and in that the tip position detector is arranged for monitoring motion of the probe tip only in a second in-plane main direction transverse to the first in-plane main direction.

4. The atomic force microscopy system according to claim 1, wherein the first signal application actuator is arranged for generating a first displacement field having a first displacement direction in the out-of-plane direction and in that the tip position detector is arranged for monitoring motion of the probe tip only in an in-plane direction.

5. The atomic force microscopy system according to claim 1, wherein the signal analyzer is configured for mapping one or more subsurface structures located in the semiconductor device or configured for monitoring lithographic parameters in the semiconductor device.

6. A method for mapping one or more subsurface structures located in a semiconductor device or for monitoring lithographic parameters in a semiconductor device, in which method an atomic force microscopy system according to any one of the preceding claims is used, said method comprises the step of generating by the first signal application actuator the first displacement field in the first displacement direction only, and by monitoring motion of the probe tip only in the at least one direction orthogonal to the first displacement direction by the tip position detector.

7. The method according to claim 6, wherein the method comprises the step of generating the first displacement field having a first displacement direction in an in-plane direction parallel to the substrate main surface and the step of monitoring motion of the probe tip only in the out-of-plane direction transverse to the substrate main surface.

8. The method according to claim 6, wherein the method comprises the step of generating the first displacement field having a first displacement direction in a first in-plane main direction and the step of monitoring motion of the probe tip only in a second in-plane main direction transverse to the first in-plane main direction.

9. The method according to claim 6, wherein the method comprises the step of generating the first displacement field having a first displacement direction in the out-of-plane direction and the step of monitoring motion of the probe tip only in an in-plane direction.

10. The method according to claim 6, wherein the method comprises the step of detecting vibration of the cantilever in a direction not present in the generated displacement field.

11. A method for mapping one or more subsurface structures located in a semiconductor device or for monitoring lithographic parameters in a semiconductor device, the method comprising using the tip position detector of the atomic force microscopy system of claim 1 for monitoring motion of the probe tip only in at least one direction orthogonal to the first displacement direction.

12. The method of claim 11, wherein the first signal application actuator is arranged for generating a first displacement field having a first displacement direction in an in-plane direction parallel to the substrate main surface and wherein the tip position detector is arranged for monitoring motion of the probe tip only in the out-of-plane direction transverse to the substrate main surface.

13. The method of claim 11, wherein the first signal application actuator is arranged for generating a first displacement field having a first displacement direction in a first in-plane main direction and wherein the tip position detector is arranged for monitoring motion of the probe tip only in a second in-plane main direction transverse to the first in-plane main direction.

14. The method of claim 11, wherein the first signal application actuator is arranged for generating a first displacement field having a first displacement direction in the out-of-plane direction and wherein the tip position detector is arranged for monitoring motion of the probe tip only in an in-plane direction.

* * * * *